Dec. 1, 1959   G. ROHLOFF ET AL   2,914,998
PHOTOGRAPHIC CAMERA WITH INTERCHANGEABLE OBJECTIVES
Filed Dec. 30, 1954

INVENTORS.
Gunter Rohloff
Johann Schwister
by Singer, Stern & Carlberg
Attorneys

United States Patent Office 2,914,998
Patented Dec. 1, 1959

2,914,998

PHOTOGRAPHIC CAMERA WITH INTERCHANGEABLE OBJECTIVES

Günter Rohloff and Johann Schwister, Berlin-Steglitz, Germany, assignors to Zeiss Ikon A.G., Stuttgart, Stuttgart-S, Germany Application December 30, 1954, Serial No. 478,817

Claims priority, application Germany December 30, 1953

3 Claims. (Cl. 95—45)

In order to obtain a satisfactory exposure in photographic work, it is important not only that the operator gets the object to be photographed sharply reproduced but also that he is aware of what depth of focus range will be obtained at the distance adjustment and diaphragm aperture employed. Therefore, it is common practice to combine the distance scale with an aperture scale that permits a reading of the depth of focus range. In cameras with front lens adjustment, the lens usually carries the distance scale and the shutter housing carries the aperture scale while, with interchangeable objectives having depth of focus adjustment through rotation of two objective parts relative to each other, both scales are disposed on the objective.

The invention relates to a camera with interchangeable objectives in which the depth of focus adjustment is not achieved by relative rotation of two objective parts but by adjustment of the entire objective by means of operating means attached to the camera.

An object of the invention is to provide operating means of the character described which, for the purpose of depth of focus adjustment, are equipped with two or more adjustable scales arranged for coaction with a like number of adjustable scales on the camera.

Another object of the invention is to provide means of the character described and equipped as indicated above in which the pair of scales corresponding to the focal distance of the inserted objective are visible and permit reading of the adjusted distance and the depth of focus range at the different diaphragm apertures.

Still another object of the invention is to provide means as set forth above in which the scales always are in such a position as to make them readily readable in the exposure position of the camera.

Figures 2, 3:
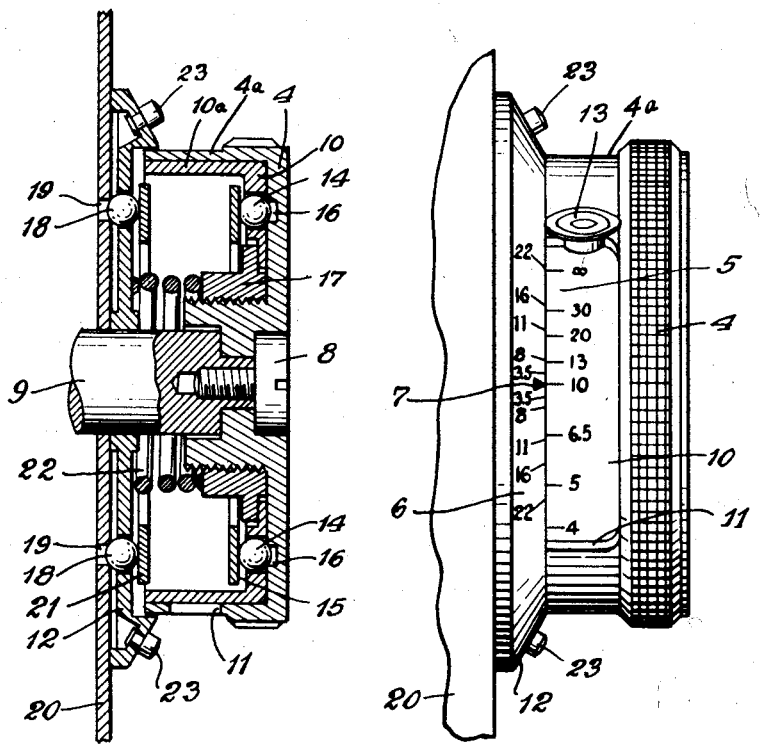
Figure 1:
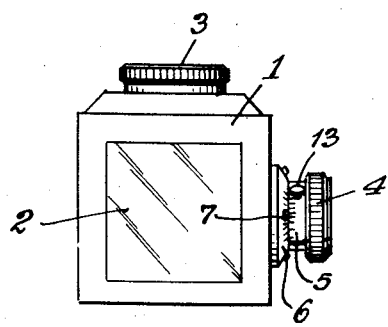

Other objects and advantages of the invention will be evident from the following description with reference to the accompanying drawings, in which:

Fig. 1 is a top plan view of a mirror reflector camera according to the invention, Fig. 2 is an enlarged view of a part of Fig. 1, Fig. 3 shows a cross-sectional view of Fig. 2 in the plane of the drawing sheet.

Corresponding parts have the same reference letters in the several views.

The camera 1 is provided with a large size viewer 2 through which the image produced by the viewer objective 3 can be observed. For common adjustment of the viewer objective 3 and the photographic objective, which latter is not shown in Fig. 1 because it is covered by the viewer objective, is employed a manually operable rotatable knob 4 which is mounted on one of the two side walls of the camera. Said knob is provided with a distance scale 5 which cooperates with a stationary aperture scale 6 on the camera. An index mark 7 serves to indicate the point where the distance is shown.

The knob 4 is non-rotatably secured to a shaft 9 by means of a screw 8, and said shaft 9 is connected through intermediary members (not shown) with the objectives so that turning of the shaft 9 causes adjustment of the objectives. Such connecting means are well known in the art and need not be described in detail.

The knob 4 is provided with a cylindrical flange 4a which surrounds an interior member 10 having a cylindrical flange 10a provided with a distance scale 5. The cylindrical flange 4a of the knob 4 is provided with a window 11 through which the distance scale 5 is visible, as shown in Fig. 2. A diaphragm aperture scale 6 is disposed on a ring 12 which concentrically surrounds the cylindrical flange 4a. The aperture values are arranged at both sides of the index mark 7, which is located between the two figures indicating the largest aperture value.

With this arrangement, the depth of focus range can be readily observed. If, as indicated in Fig. 2, the distance is adjusted to 10 feet, the aperture value 3.5 gives a depth of focus range of from about 9 to 11.5 feet while, for instance, the aperture value 8 gives a depth of focus of about 8 to 13 feet, etc. Naturally, the scales could be reversed, i.e. the member 10 could carry the aperture scale and the ring 12 could carry the distance scale. However, this reversed arrangement would have the disadvantage that the mark 7 would not be stationary which would render the reading more difficult.

The scale carrier 10 is rotatable relative to the knob 4 in order to bring another scale arranged on another portion of the circumference of the flange 10a into the window aperture 11 of the flange 4a. For this adjustment a handle 13 is used, and a snap lock device effects the locking in the desired position. Said snap lock device comprises balls 14 mounted in bores provided in a circular wall of the scale carrier 10 and actuated by a spring ring 15 towards engagement in recesses 16 in the knob 4. A threaded member 17 is screwed onto an interior hub of the knob 4 and holds the members 4 and 10 together loosely enough to permit relative rotation thereof.

A similar snap lock device is provided for the ring 12. In this case, balls 18 mounted in bores in the ring 12 cooperate with recesses 19 in the camera wall 20. The balls are retained by a spring ring 21, and a spring 22 retains the ring 12 in close engagement with the wall 20. Knobs 23 serve as handles by means of which the ring 12 is adjustable to the required position. The ring 12 can, of course, be enclosed in a housing (not shown) having a window through which the scale 6 is visible.

It may be remarked that the device of Figs. 2 and 3 is suitable for two or, at the most, three pairs of scales since the window 11 cannot be extended over too large a portion of the circumference of the knob 4 due to reasons of strength of the material.

What we claim is:

1. In a photographic camera having interchangeable objectives of different focal lengths and manually operable actuating means for focus adjustment of a selected one of said objectives, said actuating means being located one one of the side walls of the camera and including a shaft projecting through said side wall, a manually operable knob fixedly attached to the outwardly projecting end of said shaft to rotate the latter when said knob is rotated, said knob being provided at its circumference with a cylindrical flange having a longitudinal window aperture therein extending in the circumferential direction of said flange, a scale carrier provided with a cylindrical flange mounted for relative rotative adjustment with respect to said knob within the latter, a plurality of distance scales arranged in circumferential succession on said cylindrical flange of said scale carrier in such a manner that only one scale at a time is visible through said window aperture in the cylindrical flange of said knob, each one of said distance scales corresponding to the focal length of one of said interchangeable objectives, releasable locking means within said knob arranged between the latter and said scale carrier and including a spring ring for normally retaining said knob and scale carrier in their selected relative positions with respect to each other, a ring mounted on said side wall of the camera concentrically with respect to said manually operable knob and having an index mark thereon opposite the distance scale appearing in the window provided in the cylindrical flange of said knob, said ring having also two similar diaphragm scales thereon extending from said index mark into opposite circumferential directions, the diaphragm sizes as indicated by said diaphragm scales decreasing progressively in a direction away from said index, and the values of the distance scales appearing opposite any two similar diaphragm sizes indicating depth of focus for any selected diaphragm size to which the selected objective attached to the camera is adjusted.

2. In a photographic camera having interchangeable objectives of different focal lengths and manually operable actuating means for focus adjustment of a selected one of said objectives, said actuating means being located on one of the side walls of the camera and including a shaft projecting through said side wall, a manually operable knob fixedly attached to the outwardly projecting end of said shaft to rotate the latter when said knob is rotated, said knob being provided at its circumference with a cylindrical flange having a longitudinal window aperture therein extending in the circumferential direction of said flange, a scale carrier provided with a cylindrical flange mounted for relative rotative adjustment with respect to said knob within the latter, a plurality of distance scales arranged in circumferential succession on said cylindrical flange of said scale carrier in such a manner that only one scale at a time is visible through said window aperture in the cylindrical flange of said knob, each one of said distance scales corresponding to the focal length of one of said interchangeable objectives, releasable locking means within said knob arranged between the latter and said scale carrier and including a spring ring for normally retaining said knob and scale carrier in their selected relative positions with respect to each other, a handle on said scale carrier extending outwardly through the window in the flange of said knob for effecting a relative rotative adjustment between said knob and said scale carrier upon overcoming the locking action of said locking means so as to bring another one of said distance scales into said window, a ring mounted on said side wall of the camera concentrically with respect to said manually operable knob and having an index mark thereon opposite the distance scale appearing in the window provided in the cylindrical flange of said knob, said ring having also two similar diaphragm scales thereon extending from said index mark into opposite circumferential directions, the diaphragm sizes as indicated by said diaphragm scales decreasing progressively in a direction away from said index, and the values of the distance scales appearing opposite any two similar diaphragm sizes indicating the depth of focus for any selected diaphragm size to which the selected objective attached to the camera is adjusted.

3. In a photographic camera as claimed in claim 1, in which said ring with said index and said two oppositely extending diaphragm scales thereon is rotatably mounted about the axis of said shaft, adjacent said side wall of the camera, and including another releasable locking means arranged between said ring and said side wall for normally holding said ring in a selected position with respect to said side wall, said locking means upon release permitting a rotative adjustment of said ring with respect to said knob.

References Cited in the file of this patent

UNITED STATES PATENTS

| 2,048,655 | Hineline | July 21, 1936 |
| 2,220,021 | Ort | Oct. 29, 1940 |
| 2,590,165 | Fairbank et al. | Mar. 25, 1952 |

FOREIGN PATENTS

| 437,066 | Great Britain | Oct. 23, 1935 |
| 863,296 | Germany | Jan. 15, 1953 |